United States Patent [19]
Takano et al.

[11] Patent Number: 5,081,889
[45] Date of Patent: Jan. 21, 1992

[54] WORKPIECE MACHINING SYSTEM

[75] Inventors: Kohzoh Takano; Yoshinori Oyobiki; Yoshiharu Watabe; Yasuo Kondo, all of Sayama, Japan

[73] Assignee: Honda Giken Kogyo Kabushiki Kaisha, Tokyo, Japan

[21] Appl. No.: 539,313

[22] Filed: Jun. 15, 1990

Related U.S. Application Data

[63] Continuation of Ser. No. 292,542, Dec. 30, 1988, abandoned.

[30] Foreign Application Priority Data

Feb. 17, 1988 [JP] Japan .................................. 63-18682

[51] Int. Cl.5 .................... B23B 5/02; B23B 13/04; B23B 15/00
[52] U.S. Cl. .................................... 82/122; 82/123; 82/124; 82/125; 82/129
[58] Field of Search ................. 82/122, 123, 124, 125, 82/129

[56] References Cited

U.S. PATENT DOCUMENTS

| | | | |
|---|---|---|---|
| 4,097,984 | 7/1978 | Petrov | 29/563 |
| 4,159,660 | 7/1979 | Buckley et al. | 82/118 |
| 4,197,769 | 4/1980 | Smith et al. | 82/122 |
| 4,317,394 | 3/1982 | Link et al. | 82/124 |
| 4,821,612 | 4/1989 | Myers | 82/124 |

Primary Examiner—William E. Terrell

[57] ABSTRACT

A workpiece machining system for simultaneously machining the opposite surfaces of workpieces such as discs for disc brakes includes at least two machining apparatus disposed on a workpiece transfer path between a first workpiece inlet conveyor line and a second workpiece outlet conveyor line, for machining respective workpieces while holding and rotating the workpieces in the same attitude as that in which they are conveyed along the first and second conveyor lines. The workpiece machining system also includes a transfer apparatus for transferring the workpieces from the first conveyor line through the machining apparatus to the second conveyor line while maintaining the workpieces in the same attitude.

8 Claims, 13 Drawing Sheets

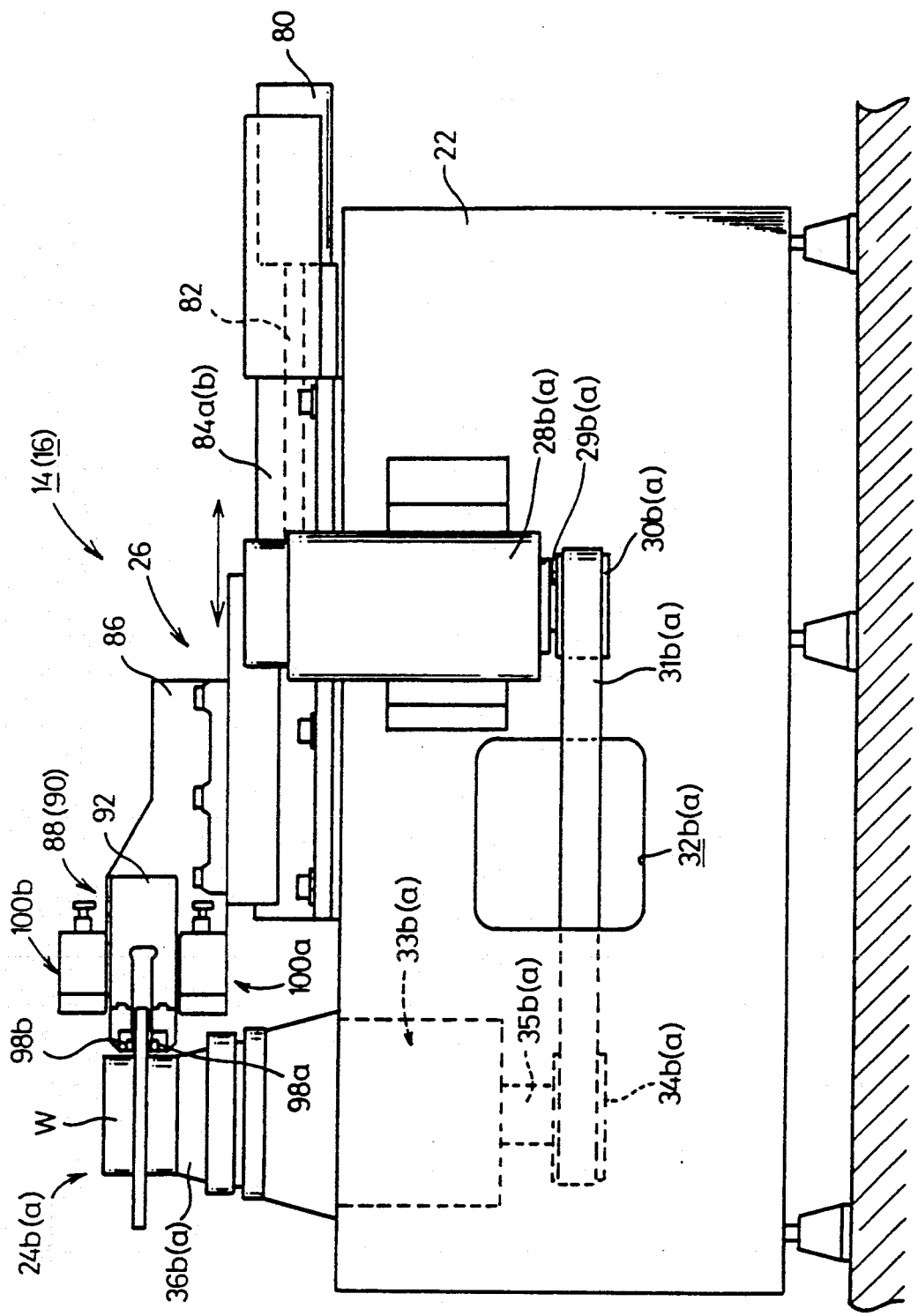

WORKPIECE MACHINING SYSTEM

This application is a continuation of application Ser. No. 07/292,542 filed on Dec. 30, 1988, now abandoned.

BACKGROUND OF THE INVENTION

The present invention relates to a workpiece machining system, and more particularly to a workpiece machining system including machining apparatus for simultaneously machining the opposite sides of a disc for a disc brake while rotating the disc which lies in a horizontal plane, the workpiece machining system having means for conveying the disc in the horizontal plane from a workpiece inlet conveyor line to the machining apparatus and also to a workpiece outlet conveyor line, so that the disc can be conveyed easily in a short period of time and can be machined efficiently.

Line production processes are widely employed to machine a large number of workpieces efficiently. According to the line production processes, a variety of machining apparatus are disposed alongside of a machining line, and workpieces that are conveyed one by one to the machining line are machined successively by the machining apparatus.

One conventional apparatus for machining the opposite surfaces of a relatively thin workpiece such as a disc for a disc brake is disclosed in Japanese Laid-Open Patent Publication No. 59-24940. In the disclosed arrangement, a robot which can be displaced in a predetermined direction is disposed between the machining apparatus and a conveyor line which conveys a disc-shaped workpiece in a horizontal plane with a pallet. The workpiece is gripped by a hand attached to the distal end of an arm of the robot, and then the arm is turned and at the same time the robot is displaced in the predetermined direction to orient the workpiece vertically and mount the workpiece on the machining apparatus, which then machines the workpiece.

As described above, the workpiece which has been fed in the horizontal plane along the conveyor line has to be oriented from the horizontal position to the vertical position, installed on the working apparatus. Then, the machined workpiece has to be reoriented to the vertical position before it is placed on a pallet on the conveyor line. Therefore, the procedure for controlling the robot to transfer the workpiece between the conveyor line and the machining apparatus and to orient and reorient the workpiece is considerably complex, and it is time-consuming to convey workpieces through the conveyor line and the machining apparatus. Thus, the conventional system cannot meet the demand for machining a large number of workpieces efficiently.

If a workpiece is a brake disc, then the opposite surfaces thereof have to be machined. The above prior system consumes a considerable period of time in machining the workpiece.

Various machining apparatus have been proposed for simultaneously machining the opposite surfaces of a workpiece with a view to increasing machining efficiency. One example of such machining apparatus is shown in Japanese Laid Open Patent Publication No. 59-37002. According to the disclosed apparatus, a workpiece is vertically mounted on the distal end of a horizontally extending spindle by means of a chuck mechanism, and a pair of cutting tools which are horizontally movable toward and away from each other is brought into engagement with the opposite surfaces, respectively, of the workpiece which is being rotated by the spindle, thus simultaneously machining the opposite surfaces of the workpiece.

With this conventional system, however, it is necessary to orient a workpiece which has been conveyed in a horizontal plane on a conveyor line into a vertical position, and install the vertical workpiece on the spindle, and after the workpiece has been machined, it is necessary to detach the workpiece from the spindle, reorient the workpiece into a horizontal position, and then deliver the horizontal workpiece onto the conveyor line. Accordingly, a transfer device for transferring the workpiece between the conveyor line and the machining apparatus is complex in structure and operation, expensive to manufacture, and cannot rapidly transfer the workpiece. As a result, the efficiency of the entire machining process is not increased.

The workpiece is gripped only at its central portion by a chuck mechanism while the workpiece is being machined. Where an inner wall around a small central hole of a workpiece is gripped, as is the case with a disc for a disc brake which has a central hole that is considerably small in diameter as compared with the diameter of the entire disc, the disc tends to be vibrated due to resistance to the cutting of the disc. The outer peripheral edge of the disc may be held by chuck fingers or the like, but those areas of the disc which are gripped by the chuck fingers are not machined.

In the above prior apparatus, two cutting tools are mounted respectively on tool bases which are threaded over a single screw shaft and displaceable in opposite directions upon rotation of the screw shaft about its own axis. Practically, it is highly difficult to keep the two cutting tools spaced from each other by a highly accurate interval. While the workpiece is being machined, the tool bases are moved by resistance applied to the cutting tools, with the result that the workpiece cannot be machined with high accuracy.

Since the spindle extends horizontally and the tool bases are movable toward and away from each other along the axis of the spindle, the machining apparatus is large in overall size. If a number of such machining apparatus are combined for machining a large number of workpieces efficiently, the entire system takes up a considerably large space.

For transferring a relatively thin workpiece such as a disc for a disc brake between a conveyor line and a machining apparatus, there may be employed a first feed device for pressing and holding an inner wall of the workpiece around a central hole defined therein and a second feed device for pressing and gripping an outer peripheral wall of the workpiece with retractable fingers, as disclosed in Japanese Laid-Open Patent Publication No. 60-15094, for example.

However, because the central hole of the workpiece is of a relatively small diameter as compared with the diameter of the entire workpiece, the workpiece is liable to drop from the first feed device. Furthermore, the workpiece may not be centered accurately in the second feed device. As a consequence, the workpiece may not be transferred reliably to the machining apparatus, and may fail to be properly installed on the machining apparatus.

SUMMARY OF THE INVENTION

It is a major object of the present invention to provide a workpiece machining system including machining apparatus each having a pair of cutting tools that are vertically movable toward and away from each other for simultaneously machining the opposite sides of a thin workpiece such as a disc for a disc brake while clamping and rotating the workpiece which lies in a horizontal plane, the workpiece machining system having means for conveying the workpiece to a workpiece inlet conveyor line, the machining apparatus, and a workpiece outlet conveyor line, while the workpiece is lying in the horizontal plane at all times, so that the workpiece can be conveyed easily in a short period of time and can be machined efficiently.

Another object of the present invention is to provide a workpiece machining system comprising: at least two machining apparatus disposed on a workpiece transfer path between a first workpiece inlet conveyor line and a second workpiece outlet conveyor line, for machining respective workpieces while holding and rotating the workpieces in the same attitude as that in which they are conveyed along said first and second conveyor lines; and a transfer apparatus for transferring the workpieces from said first conveyor line through said machining apparatus to said second conveyor line while maintaining the workpieces in the same attitude.

Still another object of the present invention is to provide a workpiece machining system, wherein each of said machining apparatus comprises a workpiece gripping mechanism for holding and rotating a workpiece in a horizontal attitude, and a cutting mechanism having a machining unit for simultaneously machining upper and lower surfaces of the workpiece which is being held and rotated by said workpiece gripping mechanism.

Still another object of the present invention is to provide a workpiece machining system, wherein said cutting mechanism has means for moving said machining unit toward and away from the center of rotation of said workpiece gripping mechanism.

Yet another object of the present invention is to provide a workpiece machining system, wherein said machining unit comprises a pair of cutting tools vertically spaced from each other and movable toward and away from each other by an actuator.

Yet another object of the present invention is to provide a workpiece machining system, wherein said workpiece gripping mechanism comprises a vertically extending spindle and a chuck unit disposed upwardly of said spindle for gripping said workpiece, said chuck unit being rotatable in unison with said spindle.

Still another object of the present invention is to provide a workpiece machining system, wherein each of said machining apparatus comprises two workpiece gripping mechanisms spaced from each other, a block movable toward and away from said workpiece gripping mechanisms by an actuator, and a cutting mechanism having two machining units mounted on said block for cooperation with said workpiece gripping mechanisms, respectively.

Yet still another object of the present invention is to provide a workpiece machining system, wherein said transfer apparatus comprises a first transfer mechanism movable vertically and horizontally for transferring the workpieces from said first conveyor line to said machining apparatus, and a second transfer mechanism movable vertically and horizontally for transferring the machined workpieces from said machining apparatus to said second conveyor line.

Still another object of the present invention is to provide a workpiece machining system, wherein each of said machining apparatus comprises two workpiece gripping mechanisms spaced from each other by a distance, each of said first and second transfer mechanisms including two holder means spaced from each other by said distance for supporting the workpieces, respectively.

A still further object of the present invention is to provide a workpiece machining system, wherein each of said holder means comprises a pair of holder fingers movable toward and away from each other for supporting one of the workpieces, a rod operatively coupled to one of said holder fingers, and link means operatively connected to said holder fingers, said holder means sharing a single actuator coupled to the rods of the holder means for simultaneously actuating said holder means.

A still further object of the present invention is to provide a workpiece machining system, wherein each of said holder means has a substantially conical centering member movable toward and away from one of the workpieces for engaging in a central hole defined in the workpiece for positioning the workpiece.

A yet further object of the present invention is to provide a workpiece machining system comprising: a workpiece gripping mechanism disposed between a first workpiece inlet conveyor line and a second workpiece outlet conveyor line for holding and rotating a workpiece to be machined in the same attitude as that in which it is conveyed along said first and second conveyor lines, said work-piece gripping mechanism comprising a rotatable spindle and a chuck unit rotatable in unison with said spindle, said chuck unit comprising: a collet chuck expandable radially outwardly by a resilient member for engaging in a reference hole defined in the workpiece; a rod movable axially of said spindle for allowing said collet chuck to be expanded radially outwardly; a plurality of chucking rods coupled on said rod and having slanted surfaces, respectively; and a plurality of chuck fingers engaging said slanted surfaces, respectively, and movable diametrically of said spindle for pressing an inner peripheral surface of the workpiece.

A yet still further object of the present invention is to provide a workpiece machining system, wherein said chuck unit further comprises a swingable connector, said chucking rods being swingably mounted on said connector at equally angularly spaced locations thereon.

A yet further object of the present invention is to provide a workpiece machining system, wherein said chuck unit further comprises spherical bearings by which said rod and said connector, and said connector and said chucking rods are coupled.

Still another object of the present invention is to provide a workpiece machining system, further including a plurality of fixed guide members fixed to said chuck unit and alternating said chuck fingers, said chuck fingers being movable radially of said spindle.

Still another object of the present invention is to provide a workpiece machining system, wherein each of said chuck fingers has a projection extending outwardly from at least one end thereof, each of said guide members having a guide groove receiving said projection therein for guiding the projection, each of said chuck fingers having a hole in which a guide pin on said chuck unit is loosely fitted, whereby said chuck fingers can be moved radially of said spindle.

Still another object of the present invention is to provide a workpiece machining system, wherein said guide groove of each said guide member is larger in size than said projection of each said chuck finger, and said hole of each said chuck finger being larger in diameter than said guide pin on the chuck unit, whereby said chuck fingers can be moved circumferentially of said spindle.

Yet another object of the present invention is to provide a workpiece machining system, wherein said chuck unit comprises three chucking rods and three chuck fingers.

It is also an object of the present invention to provide a workpiece machining system comprising: a cutting mechanism disposed between a first work-piece inlet conveyor line add a second workpiece outlet conveyor line for machining the opposite surfaces of a work-piece which is being rotated in the same attitude as that in which it is conveyed along said first and second conveyor lines, said cutting mechanism comprising a block movable toward and away from said workpiece and at least one machining unit for simultaneously machining the opposite surfaces of the workpiece, said machining unit comprising: a pair of cutting tools for machining the opposite surfaces of the workpiece; a pair of elastically deformable tool holder arms supporting the cutting tools, respectively; and a pair of presser means for forcibly elastically deforming said tool holder arms, respectively, to position said cutting tools for a thickness to which said workpiece is to be cut by said cutting tools.

Still another object of the present invention is to provide a workpiece machining system, wherein each of said presser means includes a cylinder having a positionally adjustable stopper on one end, a piston slidably movable in said cylinder, a piston rod extending from said piston and having a slanted surface, and a presser engaging said slanted surface and movable in a direction substantially normal to said piston rod, the arrangement being such that when said piston rod abuts against said stopper by operating said cylinder, said presser is displaced toward one of said cutting holder arms to forcibly elastically deform said cutting holder arm.

Still another object of the present invention is to provide a workpiece machining system, wherein said tool holder arms are vertically spaced from each other, said presser means being mounted respectively on outer surfaces of said tool holder arms opposite to confronting inner surfaces thereof, the arrangement being such that said block is moved with respect to the workpiece rotating in a horizontal attitude to cause said cutting tools supported on said tool holder arms to simultaneously machine the opposite surfaces of said workpiece.

Yet another object of the present invention is to provide a workpiece machining system, wherein said tool holder arms are formed by dividing one end of a single holder and spaced from each other.

Yet still another object of the present invention is to provide a workpiece machining system, wherein said cutting mechanism comprises two machining units mounted on said block.

A still further object of the present invention is to provide a workpiece machining system comprising: a transfer apparatus for transferring a workpiece in the same attitude to a first workpiece inlet conveyor line, a workpiece machining apparatus, and a second workpiece outlet conveyor line, said transfer apparatus having holder means comprising a pair of receivers movable toward each other by a first actuator for supporting one side of the workpiece, and a centering member movable toward the other side of said workpiece by a second actuator and engageable in a hole defined in the workpiece to position the workpiece, whereby said workpiece can be gripped jointly by said receivers and said centering member.

A yet further object of the present invention is to provide a workpiece machining system, wherein said holder means further comprises a pair of first fingers and a pair of second fingers, said receivers being mounted on said first fingers and said second fingers, respectively, said first actuator comprising a cylinder operable for angularly displacing said first and second fingers toward and away from each other through link means.

Still another object of the present invention is to provide a workpiece machining system, wherein said link means comprises a ring disposed rotatably coaxially with said centering member, first and second swing plates extending radially outwardly from said ring, and a pair of rods having ends coupled to said first and second swing plates, respectively, and other ends coupled to said first and second fingers, respectively.

Yet still another object of the present invention is to provide a workpiece machining system, wherein said transfer apparatus has two holder means, said first actuator comprising a cylinder having a piston rod, and a connecting rod extending substantially perpendicularly to said piston rod and coupled thereto, said connecting rod having opposite ends engaging the first fingers of the respective holder means.

Yet another object of the present invention is to provide a workpiece machining system, wherein said second actuator comprises a cylinder having a piston rod, said centering member being of a substantially conical shape and mounted on an end of said piston rod.

The above and other objects, features and advantages of the present invention will become more apparent from the following description when taken in conjunction with the accompanying drawings in which a preferred embodiment of the present invention is shown by way of illustrative example. It should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is an enlarged side elevational view of the workpiece machining system;

DETAILED DESCRIPTION OF THE PREFERRED EMBODIMENT

Figure 1:
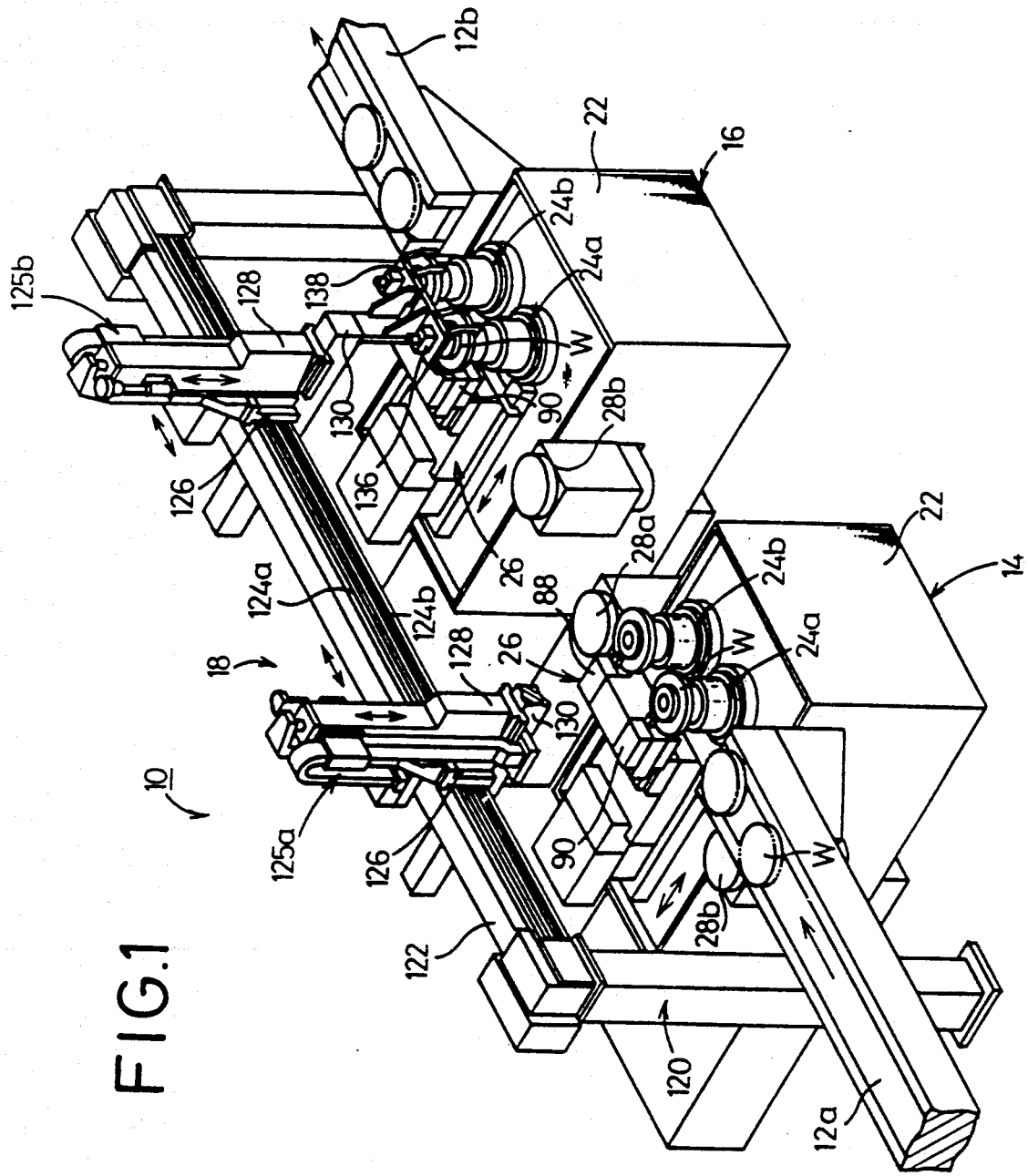
FIG. 1 is a perspective view of a workpiece machining system.
Figure 2:
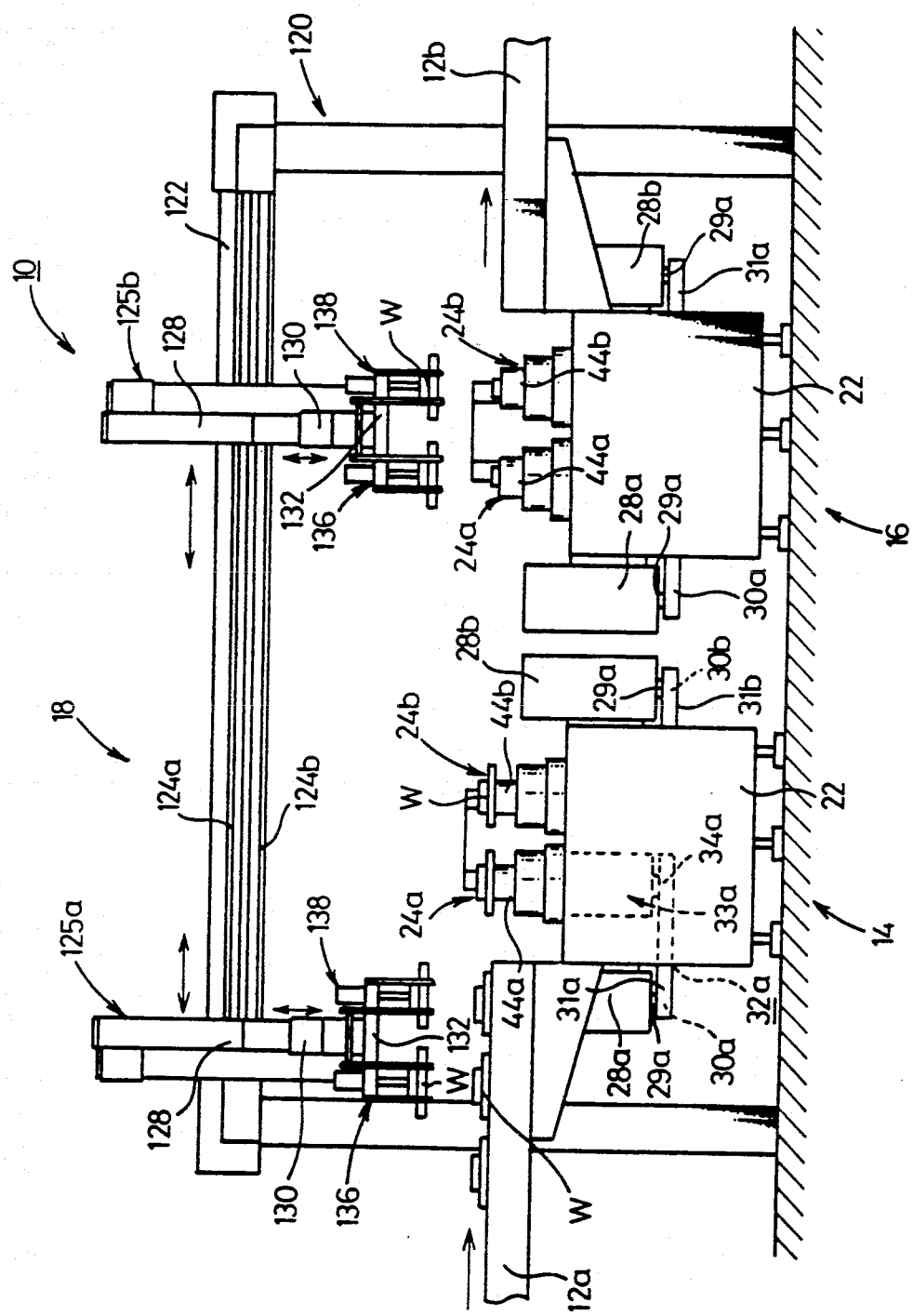
FIG. 2 is a front elevational view of the workpiece machining system.

FIGS. 1 and 2 show a workpiece machining system, generally denoted by the reference numeral 10, according to the present invention. The workpiece machining system 10 which is disposed in a production line is disposed in a workpiece transfer path between a first inlet conveyor 12a for conveying workpieces W such as discs for disc brakes in the direction of the arrow while holding them in a horizontal plane, and a second outlet conveyor 12b for conveying machined workpieces W in the direction of the arrow. The workpiece machining system 10 basically comprises first and second machining apparatus 14, 16 each for holding two workpieces W in a horizontal plane, rotating them, and simultaneously machining the opposite surfaces of the workpieces W, and a transfer apparatus 18 for delivering workpieces W from the first conveyor 12a to the first and second machining apparatus 14, 16 and delivering machined workpieces W from the first and second machining apparatus 14, 16 to the second conveyor 12b.

The first machining apparatus 14 has a base 22 on which there are mounted workpiece gripping mechanisms 24a, 24b for holding respective workpieces W horizontally and rotating them, and a cutting mechanism 26 displaceable toward and away from the workpiece gripping mechanisms 24a, 24b for machining or cutting the opposite surfaces of the workpieces W gripped by the respective workpiece gripping mechanisms 24a, 24b. The workpiece gripping mechanisms 24a, 24b have respective axes of rotation which are positioned on a conveyor path interconnecting the centers of the workpieces W on the first and second conveyors 12a, 12b.

The workpiece gripping mechanism 24a will be described in detail below. Since the workpiece gripping mechanism 24b is identical to the workpiece gripping mechanism 24a, it will not be described in detail but those parts of the workpiece gripping mechanism 24b which are identical to those of the workpiece gripping mechanism 24a are denoted by identical reference numerals with a suffix b.

As illustrated in FIGS. 2 and 3, the workpiece gripping mechanism 24a includes a rotative drive source 28a mounted on a side panel of the base 22 and having a drive shaft 29a extending vertically downwardly and supporting a pulley 30a on the lower end thereof. A belt 31a trained around the pulley 30a extends through an opening 32a defined in the side panel of the 22. The belt 31a is also trained around a pulley 34a of a spindle unit 33a.

Figure 4A:
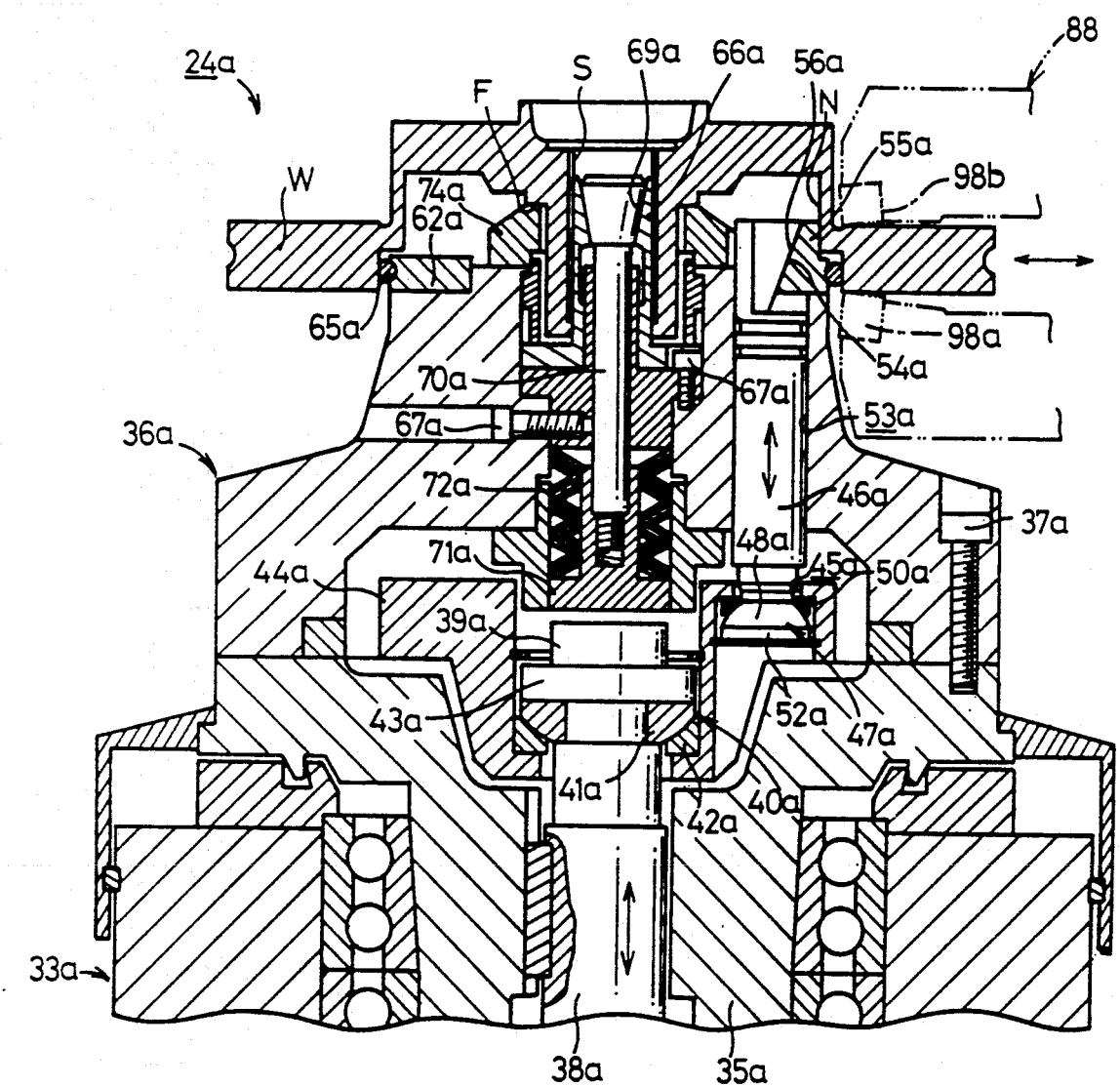
FIGS. 4a and 4b are enlarged fragmentary vertical cross-sectional views showing the manner in which a workpiece gripping mechanism of the workpiece machining system operates.
Figure 4B:
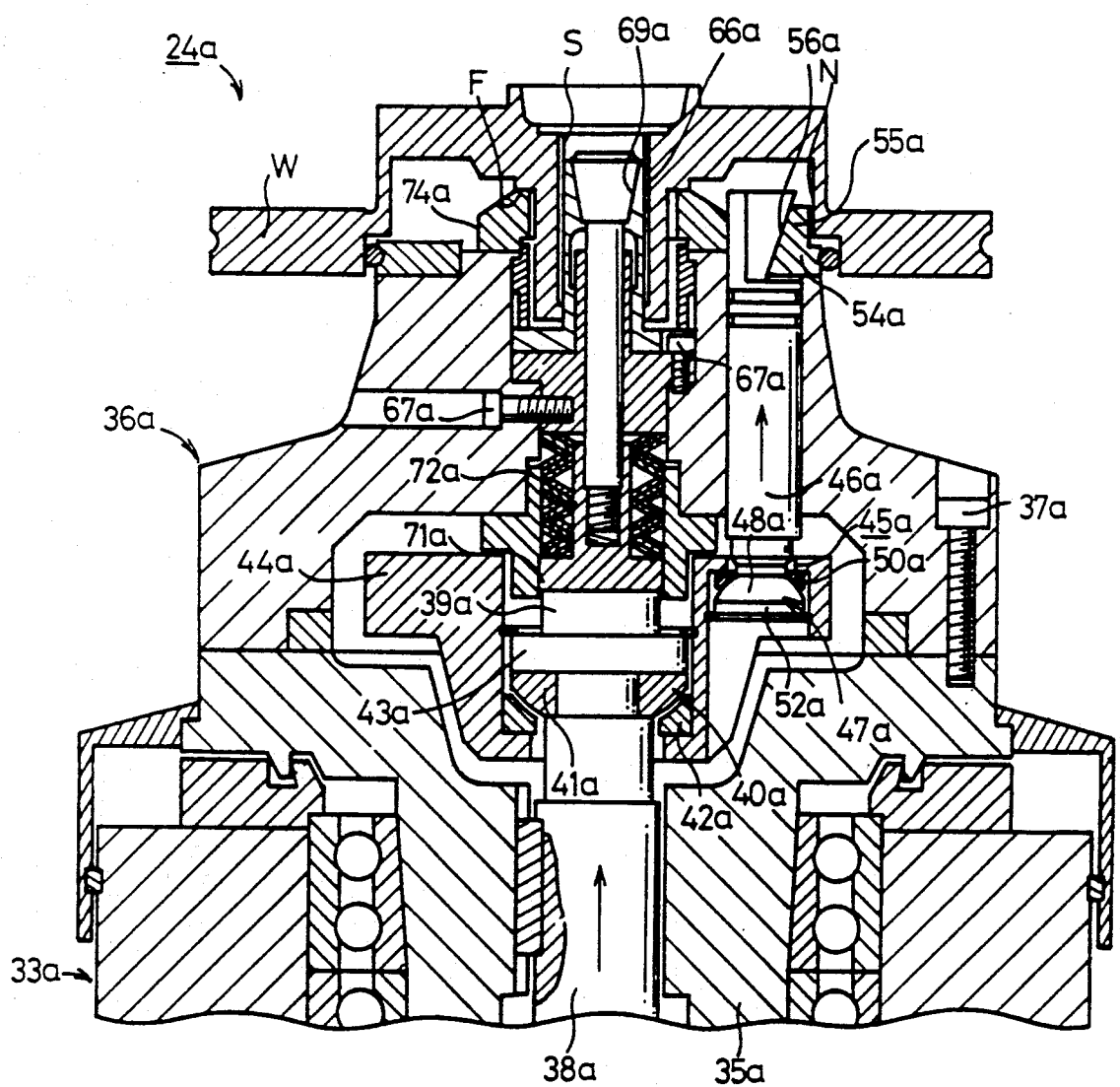

As shown in FIGS. 4a and 4b, a spindle 35a is rotatably supported in the spindle unit 33a, with the pulley 34a being mounted on the lower end of the spindle 35a.

A chuck unit 36a is fastened to the upper end of the spindle 35a by means of a bolt 37a. A piston rod 38a which is coupled to a cylinder or the like (not shown) and axially movable thereby is disposed centrally in the spindle 35a. A connector 44a engages the upper end of the piston rod 38a through a spherical bearing 40a. The spherical bearing 40a substantially comprises a partly spherical element 41a, an element seat 42a, and a holder 43a which has a presser 39a on its upper surface, the presser 39a having a predetermined diameter.

The connector 44a has three angularly equally spaced holes 45a defined axially therein. Chucking rods 46a have lower ends inserted respectively in the holes 45a and are supported by means of respective spherical bearings 47a. Each of the spherical bearings 47a includes a partly spherical element 48a, an element seat 50a, and a holder 52a. The chucking rods 46a are slidably fitted in the three respective through holes 53a defined in the chuck unit 36a parallel to the axis thereof. The chucking rods 46a have slanted surfaces 54a, respectively, on their upper portions, the slanted surfaces 54a being inclined outwardly in a vertical direction. The slanted surfaces 54a are held in engagement with respective three chuck fingers 55a disposed on the upper end of the chucking unit 36a.

Figure 7:
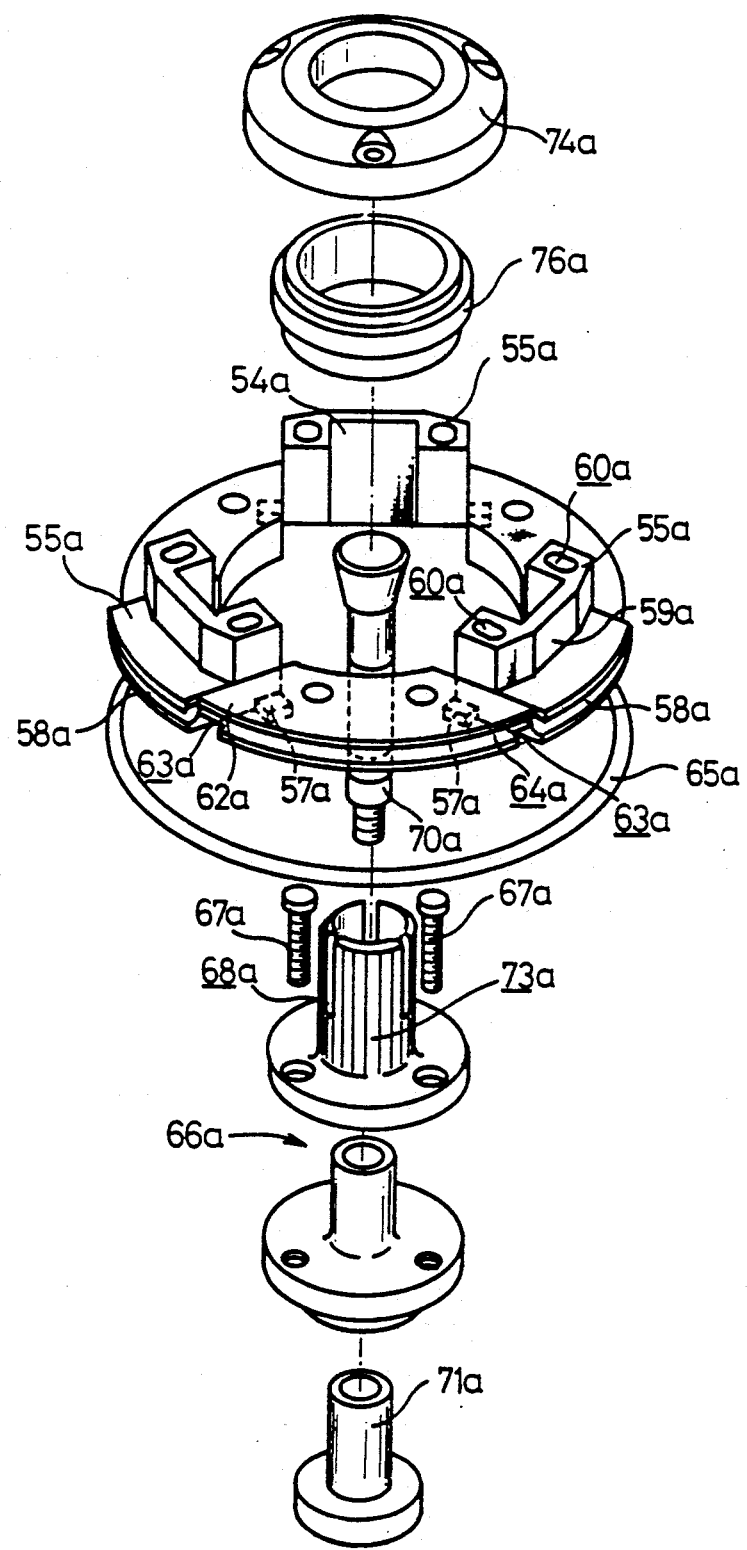

More specifically, as illustrated in FIGS. 4a, 4b and 7, each of the chuck fingers 55a has a slanted surface 56a engaged by the slanted surface 54a of one of the chucking rods 46a, and projections 57a are disposed on the opposite ends of the chuck finger 55a. Each chuck finger 55a has a groove 58a defined in an outer peripheral surface thereof, an abutment surface 59a for pressing and holding an inner peripheral surface N of a workpiece W, and a pair of oblong holes 60a. The oblong holes 60a extend in the diametric direction of the chuck finger 55a, and guide pins 61a (FIG. 5) mounted on the upper ends of the chucking unit 36a are loosely fitted in the respective holes 60a. A clearance or gap is diametrically and circumferentially defined between the edge defining each oblong hole 60a and the corresponding guide pin 61a for allowing the chuck fingers 55a to be tilted in planes normal to the axis of the chucking unit 36a.

Three arcuate guide members 62a are disposed between the chuck fingers 55a. Each of the guide members 62a has guide grooves 63a defined in respective opposite ends and receiving respective projections 57a of the chuck fingers 55a disposed one on each side of the guide member 62a. The guide members 62a also have grooves 64a defined in their outer peripheral surfaces. The guide members 62a are fastened to the chucking unit 36a by screws. An annular resilient member 65a engages in the grooves 64a of the guide members 62a and the grooves 58a of the chuck fingers 55a. Therefore, the chuck fingers 55a are normally urged radially inwardly under the resiliency of the annular resilient member 65a.

Figure 5:
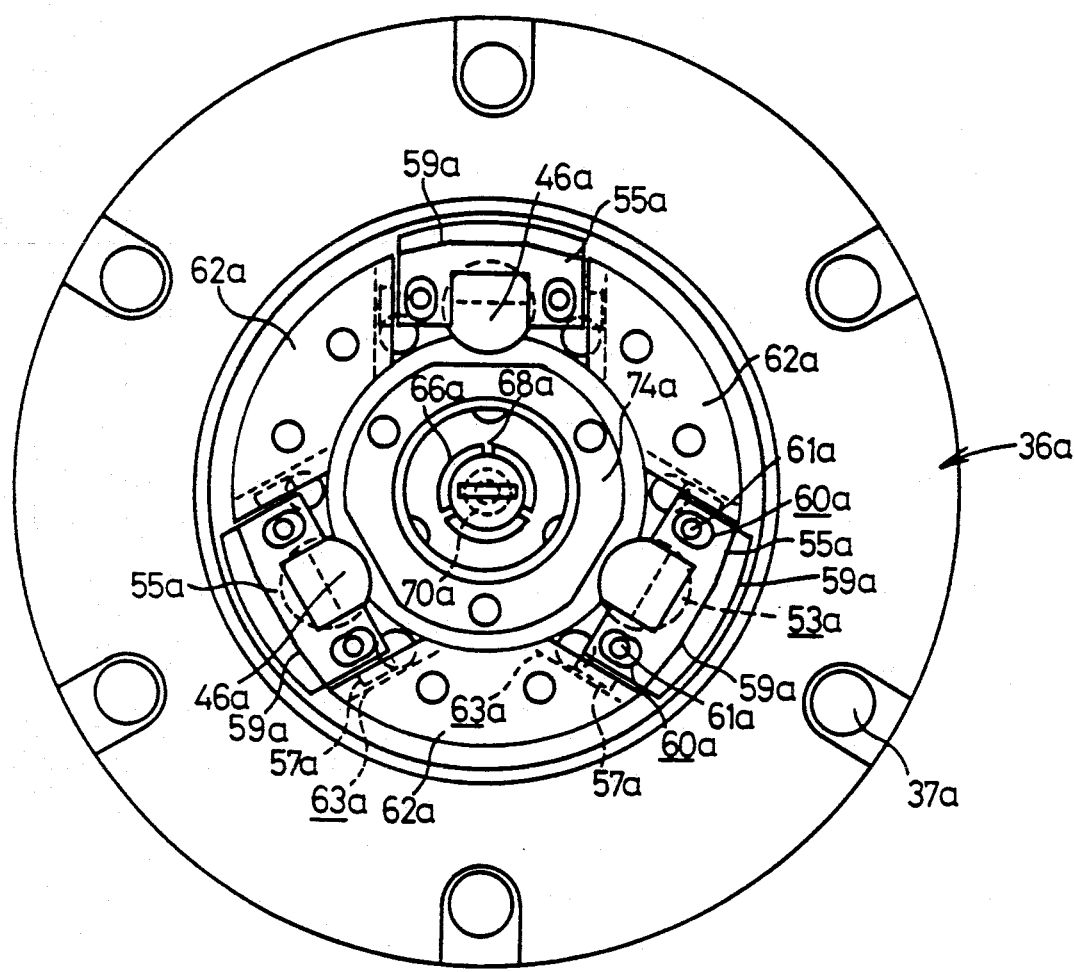
FIG. 5 is a plan view of the workpiece gripping mechanism.
Figure 6:
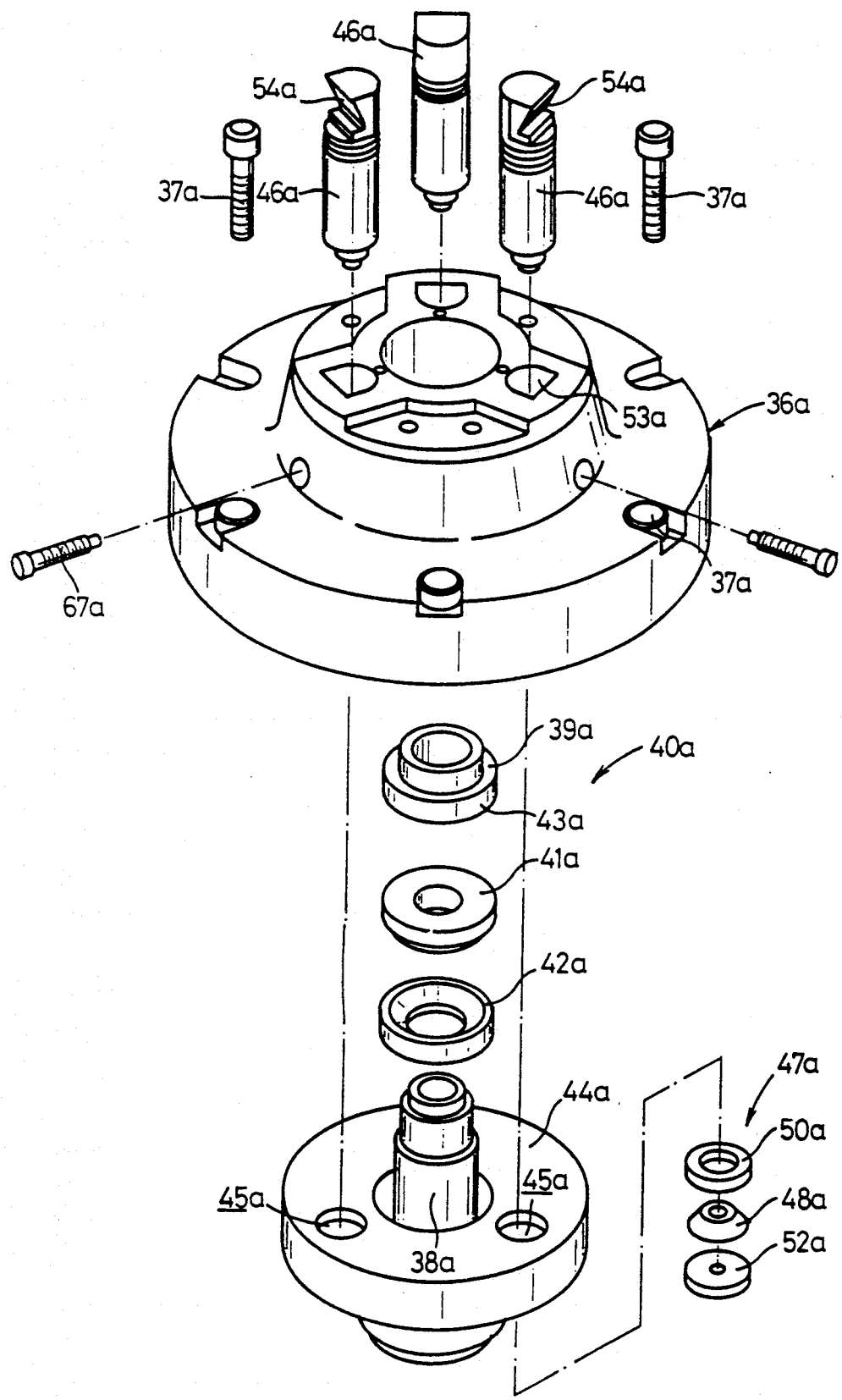
FIGS. 6 and 7 are exploded perspective views of portions of the workpiece gripping mechanism.

A collet chuck 66a is disposed centrally in the chucking unit 36a. The collet chuck 66a comprises two interengaging members which are securely fixed to the chucking unit 36a by means of screws 67a. As shown in FIGS. 5 and 7, the collet chuck 66a has an upper portion which is circumferentially divided into three portions by axial slits 68a. The collet chuck 66a has an inner peripheral tapered surface 69a (FIGS. 4a and 4b) which progressively flares in the upward direction. A tapered shaft 70a engages the tapered surface 69a and has a lower end on which there is threaded a column-shaped receiver 71a that is larger in diameter than the presser 39a. The receiver 71a is normally urged to move vertically downwardly under the bias of a spring 72a acting on an upper surface of the receiver 71a. The workpiece W has a central splined hole S defined therein, and the collet chuck 66a has grooves 73a defined on its outer peripheral surface in meshing engagement with the splines on the inner surface of the splined hole S.

A reference seat 74a is fastened to the upper end of the chucking unit 36a concentrically to the collet chuck 66a by means of screws. The workpiece W is axially positioned by holding a lower reference surface F thereof against the reference seat 74a. A spacer 76a is interposed between the reference seat 74a and the collet chuck 66a.

As shown in FIG. 3, the cutting mechanism 26 includes a rotative drive source 80 fixed to the upper surface of the base 22. From the rotative drive source 80, there extends an elongate feed screw 82 perpendicularly to the direction in which workpieces W are conveyed. Two parallel guide rails 84a, 84b are disposed one on each side of the feed screw 82, and a block 86 is movably placed on the guide rails 84a, 84b and supports a nut (not shown) through which the feed screw 82 threadedly extends. Two machining units 80, 90 are mounted on a distal end of the block 86 in alignment with the workpiece gripping mechanisms 24a, 24b, respectively, i.e., so as to be directed to the centers of rotation of workpieces W, respectively, which are held and rotated by the respective chucking units 36a, 36b.

Figure 8:
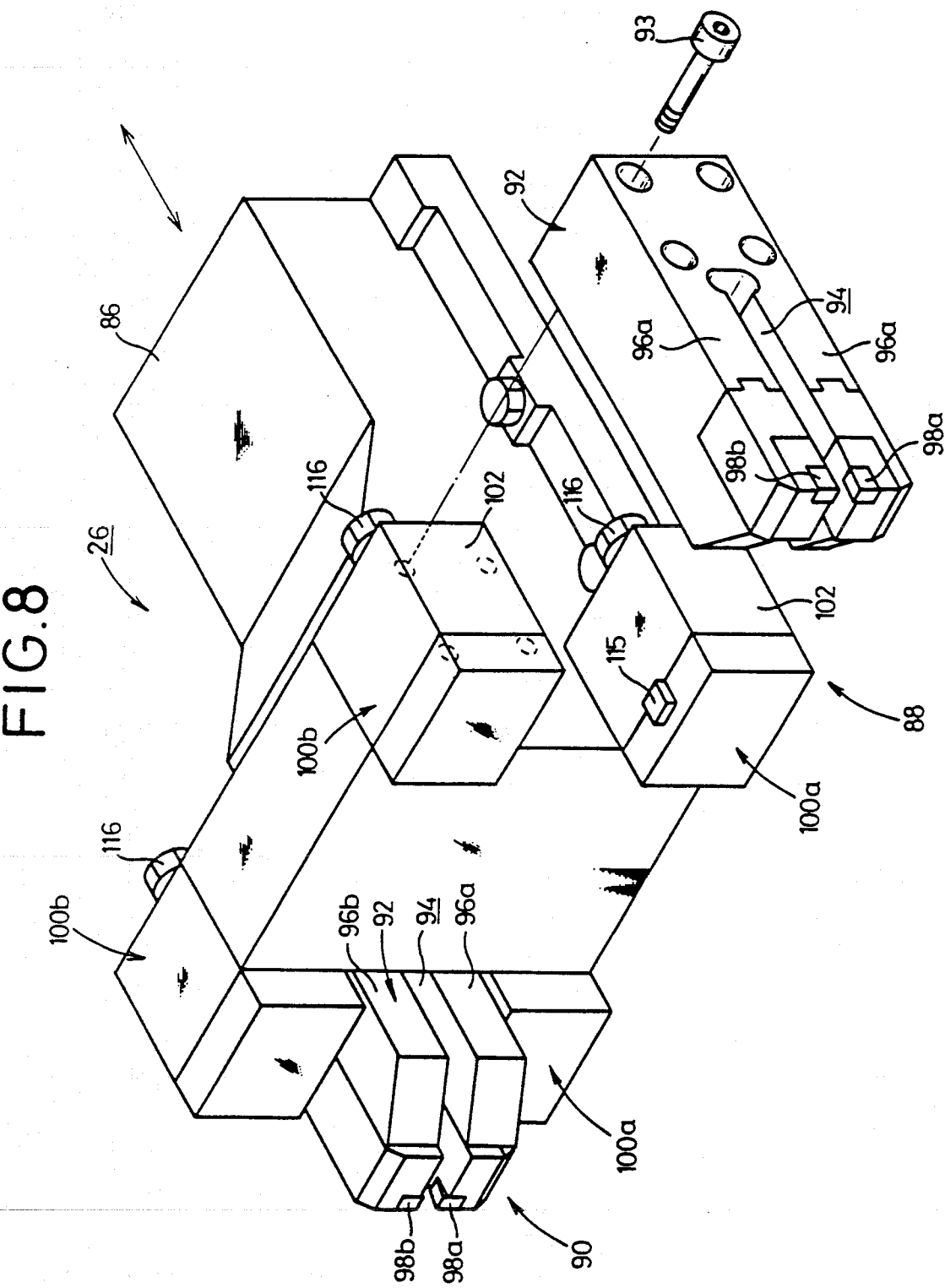
FIG. 8 is a partly exploded perspective view of a cutting mechanism of the workpiece machining system.

As shown in FIG. 8, the machining units 88, 90 have respective holders 92 which are fixed to the opposite sides of the block 86 by means of a plurality of bolts 93. The holders 92 are each substantially in the form of a rectangular parallelepiped and have a slot 94 extending from a substantially central area to one end thereof, and provided with arms 96a, 96b serving as cutting tool holders. The dimensions of the arms 96a, 96b and the material of the holders 92 are selected such that the arms 96a, 96b can be elastically deformed to a prescribed extent by presser means (described later on).

Confronting cutting tools 98a, 98b are mounted respectively on the distal ends of the arms 96a, 96b of each holder 92. The cutting cools 98a, 98b are spaced from each other by a distance which is larger than the thickness of a workpiece W. Presser means 100a, 100b (FIG. 9a) are held against the respective arms 96a, 96b.

Figure 9A:
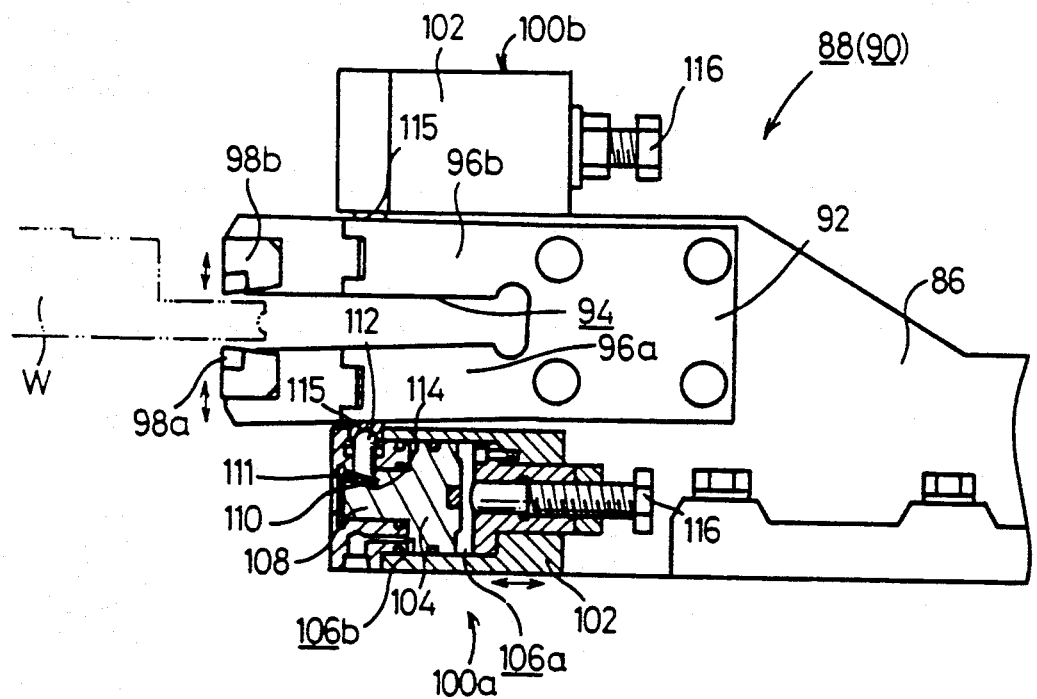
FIGS. 9a and 9b are fragmentary elevational views, partly in cross section, illustrating the manner in which the cutting mechanism operates.
Figure 9B:
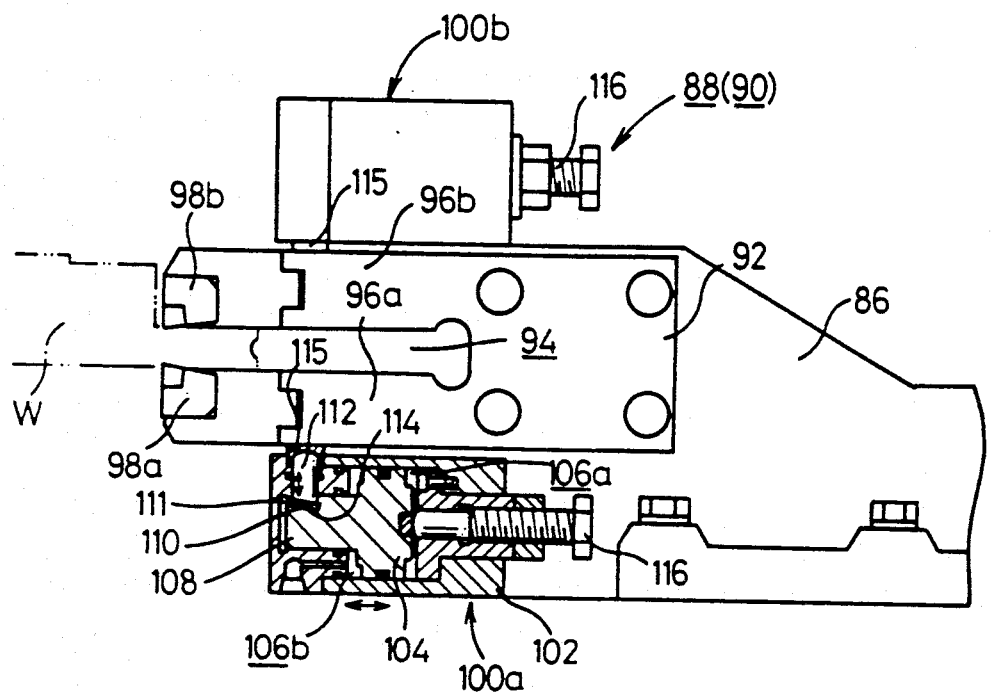

As shown in FIGS. 9a and 9b, the presser means 100a has a cylinder 102 with a piston 104 slidably disposed therein, the piston 104 defining pressure chambers 106a, 106b one on each side thereof in the cylinder 102. A piston rod 108 extends from one end of the piston 104 and has on its distal end a slanted surface 110 which is inclined radially outwardly in the axially outward direction. A plate-like hard member 111 is placed on the slanted surface 110, and held in engagement with a slanted surface 114 of a push rod 112. The piston rod 108 and the push rod 112 have respective axes which are angularly spaced from each other by 90°. The push rod 112 has an end engaging a presser 115.

A positioning bolt 116 is threaded in the cylinder 102 remotely from the piston rod 108 and has a tip end which can be inserted a desired length into the pressure chamber 106a.

The presser means 100b is identical to the pressure means 100a, and those parts of the presser means 100b which are identical to those of the presser means 100a are denoted by identical reference numerals and will not be described in detail.

The workpiece gripping mechanisms 24a, 24b and the cutting mechanism 26 of the first machining apparatus 14 have been described above in detail. The second machining apparatus 16 is also of the same construction as that of the first machining apparatus 14, and those parts of the second machining apparatus 16 which are identical to those of the first machining apparatus 14 are denoted by identical reference numerals and will not be described in detail.

The transfer apparatus 18 includes a portal-shaped frame 120 disposed between the first and second conveyors 12a, 12b and having a transverse member 122 lying parallel to the first and second conveyors 12a, 12b. To the transverse member 122, there is fixed a pair of parallel, vertically spaced guide rails 124a, 124b on which first and second transfer mechanisms 125a, 125b are displaceably mounted.

Figure 10:
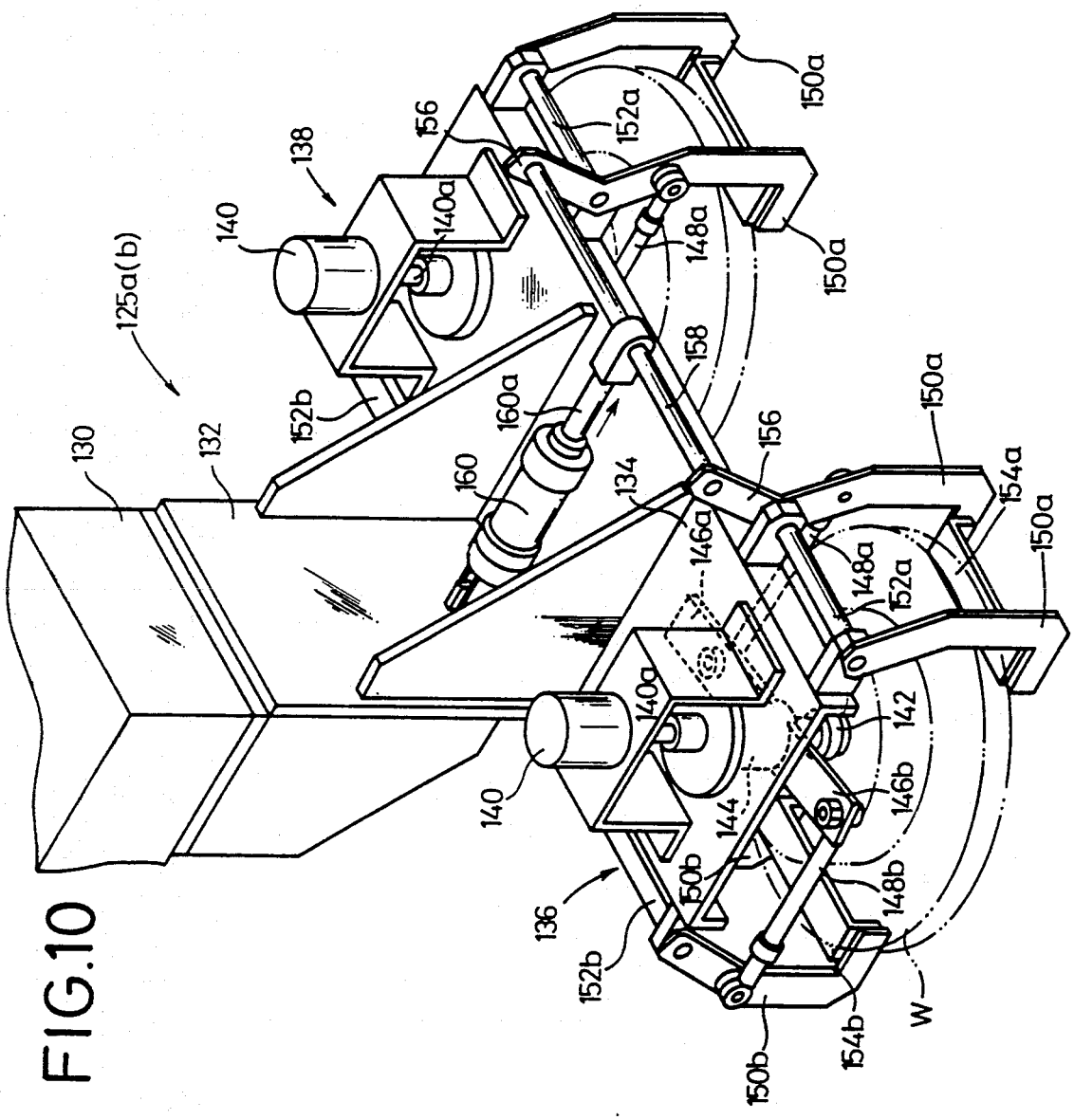
FIG. 10 is a perspective view of a feed device of the workpiece machining system.
Figure 11:
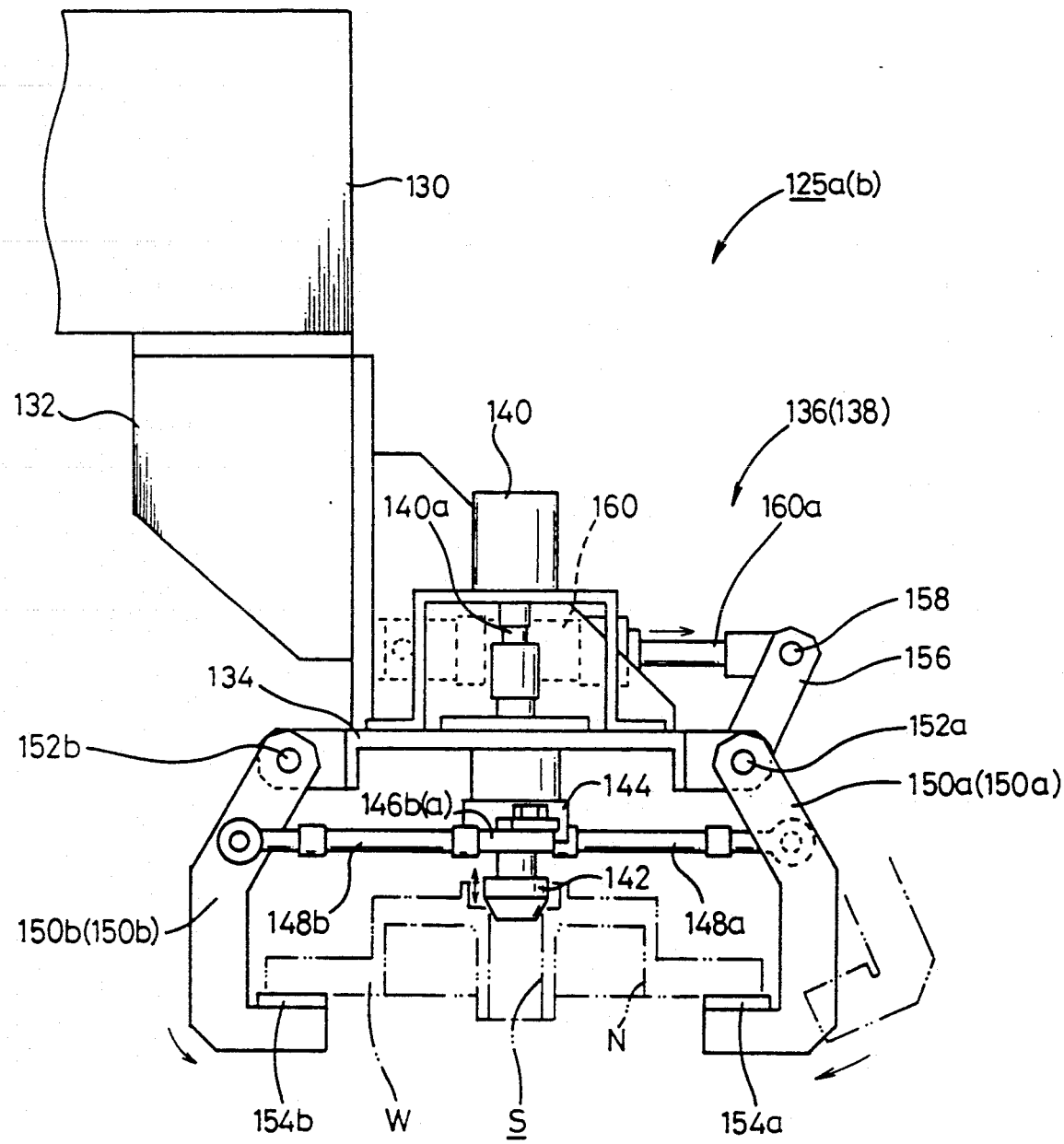
FIG. 11 is an elevational view showing the manner in which the feed device operates.

The first transfer mechanism 125a comprises a mobile body 126 engaging the guide rails 124a, 124b and movable along the transverse member 122 from a position over the first conveyor 12a to a position over the second machining apparatus 16 by means of a rack-and-pinion mechanism (not shown), for example. A vertically movable base 128 which is vertically movable by a cylinder or the like (not shown) is mounted on the mobile body 126, and an arm 130 is supported on a lower portion of the vertically movable base 128. As shown in FIGS. 10 and 11, a frame 134 is supported on the lower end of the arm 130 by means of an attachment plate 132. Holder means 136, 138 are mounted on the frame 134 and spaced from each other by a distance equal to the distance between the workpiece gripping mechanisms 24a, 24b. Since the holder means 136, 138 are identical in construction to each other, only the holder means 136 will be described in detail. Those parts of the holder means 138 which are identical to those of the holder means 136 are denoted by identical reference numerals, and will not be described in detail.

The holder means 136 has a workpiece centering cylinder 140 fixed to one end of the frame 134 and having a downwardly extending piston rod 140a which has on its lower end a substantially conical centering member 142. A rotatable ring 144 is disposed below the frame 134 coaxially with the piston rod 140a, and diametrically extending swing plates 146a, 146b are fixed to the ring 144. Two holder fingers 150a and two holder fingers 150b are openably and closably coupled to the swing plates 146a, 146b through rods 148a, 148b, respectively.

More specifically, support shafts 152a, 152b are rotatably attached to the frame 134, one on each side of the cylinder 140. The holder fingers 150a, 150b have upper ends secured to the support shafts 152a, 152b at a spaced interval. The rods 148a, 148b have ends coupled to the swing plates 146a, 146b and the other ends coupled to one of the holder fingers 150a and one of the holder fingers 150b.

The holder fingers 150a, 150b are of a bent configuration and have lower ends extending horizontally. Workpiece receiver plates 154a, 154b are affixed to the horizontal lower ends of the holder fingers 150a, 150b, respectively. One of the holder fingers 150a has a connector 156 extending upwardly from the support shaft 152a and coupled to one end of a rod 158. The other end of the rod 158 is coupled to the connector 156 of one of the holder fingers 150a of the other holder means 138. The rod 158 has a substantially central portion connected to a piston rod 160a extending from a cylinder 160 secured to the frame 134.

The second transfer mechanism 125b serves to transfer machined workpieces W from the first and second machining apparatus 14, 16 to the second conveyor 12b. The second transfer mechanism 125b is identical to the first transfer mechanism 125a and will not be described in detail, with identical components being denoted by identical reference numerals.

The workpiece machining system according to the present invention is basically constructed as described above. Operation and advantages of the workpiece machining system will be described below.

The first transfer mechanism 125a is positioned above the first conveyor 12a, and the second transfer mechanism 125b is positioned above the second conveyor 12b. The cylinder of the first transfer mechanism 125a is operated to lower the vertically movable base 128, and two workpieces W which have been conveyed in the direction of the arrow along the first conveyor 12a are gripped by the respective holder means 136, 138. The holder means 136, 138 are operated in the same manner to grip the respective workpieces W. Therefore, operation of only the holder means 136 will be described below.

The cylinder 160 is operated to displace the piston rod 160a in the direction of the arrow (FIG. 10) away from the cylinder 160. The holder fingers 150a which are coupled to the piston rod 160a through the rod 158 are angularly displaced about the support shaft 152a. The lower ends of the holder fingers 150a fixed to the support shaft 152a are angularly displaced in unison inwardly to cause the receiver 154a to support thereon the lower surface of a workpiece W at one diametrical end thereof which has been conveyed to a predetermined position on the first conveyor 12a.

When the lower ends of the holder fingers 150a are angularly moved inwardly, the swing plate 146a is angularly moved with the ring 144 by the rod 148a connected to one of the holder fingers 150a. Therefore, the swing plate 146b fixed to the ring 144 is also turned to cause the rod 148b to swing the lower ends of the holder fingers 150b inwardly until the receiver 154b supports thereon the lower surface of the workpiece W at the other diametrical end thereof.

Then, the cylinder 140 is actuated to displace the piston rod 140a downwardly to lower the centering member 142 into the splined hole S in the workpiece W which is supported on the receivers 154a, 154b. The workpiece W is now securely and accurately held in the holder means 136 by the holder fingers 150a, 150b and the centering member 142.

When the rod 158 is displaced by the cylinder 160, since the holder fingers 150a of the holder means 138 are also connected to the rod 158, another workpiece W is also held by the holder means 138 in the same manner as described above with respect to the holder means 136.

After the two workpieces W have been supported by the first transfer mechanism 125a, the vertically movable base 128 is lifted and the mobile body 126 is moved horizontally along the guide rails 124a, 124b and stopped above the second machining apparatus 16. Then, the vertically movable base 128 is lowered to place the workpieces W gripped by the respective holder means 136, 138 on the chucking units 36a, 36b of the workpiece gripping mechanisms 24a, 24b.

The cylinder 140 is then operated to retract the centering member 142 out of the splined hole S in the workpiece W, and the cylinder 160 is actuated to displace the piston rod 160a in the opposite direction, i.e., toward the cylinder 160. Thus, the holder members 150a of the holder means 136, 138 are angularly moved to turn the lower ends thereof outwardly until the receiver 154a coupled to the holder members 150a is moved away from the lower surface of the workpiece W at one diametrical end thereof. The other holder fingers 150b are also angularly moved outwardly through the rod 148b which is coupled to one of the holder fingers 150a through the swing plate 146a, the ring 144, and the swing plate 146b, until the receiver 154b is spaced away from the lower surface of the workpiece W at the opposite diametrical end thereof. The workpieces W are now released from the holder means 136, 138, after which the arm 130 is lifted.

The workpiece gripping mechanism 24a operates as follows: The piston rod 38a is moved upwardly by operating the cylinder (not shown) to enable the presser 39a to press the receiver 71a and the tapered shaft 70a upwardly. The tapered shaft 70a is lifted against the resiliency of the spring 72a to allow the collet chuck 66a to be contracted radially inwardly. The collet chuck 66a is fitted into the splined hole S in the workpiece W, and the reference surface F of the workpiece W is placed on the reference seat 74a. Then, the piston rod 38a is lowered to remove the external forces acting on the tapered shaft 70a, whereupon the tapered shaft 70a is lowered under the resiliency of the spring 72a. The collet chuck 66a is now spread radially outwardly by the tapered shaft 72a engaging the tapered surface 69a, so that the collet chuck 66a is pressed against the inner surface surface of the splined hole S of the workpiece W.

The three chucking rods 46a coupled to the piston rod 38a through the connector 44a are lowered to cause the slanted surfaces 54a of the chucking rods 46a to press the slanted surfaces 56a of the chuck fingers 55a. Therefore, the chuck fingers 55a are displaced radially outwardly against the resiliency of the annular resilient member 65a while being guided by the projections 57a and the guide grooves 63a and also by the oblong holes 60a and the guide pins 61a. The abutment surfaces 59a of the chuck fingers 55a are pressed against the inner peripheral surface N of a relatively large diameter of the workpiece W, thus positioning the workpiece W firmly and accurately with respect to the chucking unit 36a (see FIG. 4a). It can readily be understood that another workpiece W is similarly mounted on the chuck unit 36b of the other workpiece gripping mechanism 24b.

After the holder means 136, 138 have been operated to release the workpieces W, the vertically movable base 128 is lifted and the first transfer mechanism 125a is moved toward the first conveyor 12a. New workpieces W are gripped again by the first transfer mechanism 125a in the manner described above, and the first transfer mechanism 125a is moved to a position above the first machining apparatus 14. Thereafter, these workpieces W are gripped respectively by the workpiece gripping mechanisms 24a, 24b of the first machining apparatus 14. Then, the first transfer mechanism 125a is returned to the position above the first conveyor 12a, whereupon other workpieces W are gripped by the respective holder means 136, 138.

While the workpieces W are being transferred to the first machining apparatus 14 by the first transfer mechanism 125a, the workpieces W mounted on the second machining apparatus 16 are machined thereby.

More specifically, the rotative drive sources 28a, 28b of the second machining apparatus 16 are energized to rotate the pulleys 30a, 30b through the drive shafts 29a, 29b. The spindles 35a, 35b operatively coupled to the pulleys 30a, 30b through the pulleys 34a, 34b and the belts 31a, 31b are rotated to rotate the workpieces W which are supported on the chucking units 36a, 36b connected to the respective spindles 35a, 35b.

The presser means 100a, 100b of the cutting mechanism 26 are operated to position the cutting tools 98a, 98b for the thickness to which the workpiece W is to be cut. More specifically, a fluid under pressure is supplied to the pressure chamber 106b in the cylinder 102 of the presser means 100a to displace the piston 104 toward the positioning bolt 116. The piston rod 108 abuts against the tip end of the positioning bolt 116, and the push rod 112 engaging the slanted surface 110 of the piston rod 108 through the hard member 111 now projects toward the arm 96a of the holder 92. Therefore, the arm 96a is elastically deformed toward the other arm 96b by the presser 115, thus angularly moving the cutting tool 98a on the arm 96a toward the cutting tool 98b. Similarly, the cutting cool 98b on the arm 96b is angularly moved toward the cutting tool 98a by the presser means 100b. The distance between the cutting tools 98a, 98b is thus adjusted to a desired gap (see FIG. 9b).

Then, the rotative drive source 80 is operated to rotate the feed screw 82 to move the block 86 toward the workpiece gripping mechanisms 24a, 24b while being guided by the guide rails 84a, 84b. The machining units 88, 90 are moved toward the centers of rotation of the respective workpieces W which are being held and rotated by the chuck units 36a, 36b, thereby simultaneously machining the opposite surfaces of the workpieces W with the cutting tools 98a, 98b.

When the machining units 88, 90 come in the vicinity of the centers of rotation of the workpieces W and complete the machining of the opposite surfaces of the workpieces W, the rotative drive source 80 is de-energized, and a fluid under pressure is supplied into the pressure chamber 106a of the cylinder 102 of each of the presser means 100a, 100b for thereby displacing the piston 104 in a direction away from the positioning bolt 116. The push rod 112 engaging the slanted surface 110 of the piston rod 108 is now displaced away from the arms 96a, 96b, which are then displaced under their own resiliency away from each other, thus displacing the cutting tools 98a, 98b away from the opposite surfaces of the workpiece W. The rotative drive source 80 is rotated in the opposite direction to move the block 86 away from the workpiece gripping mechanisms 24a, 24b, and the rotative drive sources 28a, 28b of the workpiece gripping mechanisms 24a, 24b are inactivated to stop the rotation of the workpieces W held by the chucking units 36a, 36b.

Then, the second transfer mechanism 125b above the second conveyor 12b is moved to a position over the second machining apparatus 16, after which the arm 130 is lowered and the holder means 136, 138 grip the respective machined workpieces W. In the workpiece gripping mechanism 24a of the second machining apparatus 16, the piston rod 38a is displaced upwardly to raise the chucking rods 46a, allowing the chuck fingers 55a to be displaced radially inwardly under the resiliency of the annular resilient member 65a to release the inner peripheral surface N of the workpiece W. The tapered shaft 70a is lifted to contract the collet chuck 66a radially inwardly to release the inner wall surface of the splined hole S in the workpiece W (see FIG. 4b). The workpiece W in the workpiece gripping mechanism 24b is similarly released.

While the machined workpieces W are being delivered onto the second conveyor 12b by the second transfer mechanism 125b, the first transfer mechanism 125b which grips new workpieces W from the first conveyor 12 is moved toward the second machining apparatus 16. Then, these new workpieces W are mounted on the workpiece gripping mechanisms 24a, 24b.

During attachment of the workpieces W to and detachment of the workpieces W from the second machining apparatus 16, the workpieces W are being machined by the first machining apparatus 14. After the completion of the machining of the workpieces W on the first machining apparatus 14, these machined workpieces W are delivered toward the second conveyor 12b by the second transfer mechanism 125b, and new workpieces W on the first conveyor 12a are fed to the first machining apparatus 14 by the first transfer mechanism 125a.

In the illustrated embodiment, workpieces W which have been conveyed in the horizontal condition by the first conveyor 12a are gripped by the first transfer mechanism 125a and transferred in the same horizontal condition to the workpiece gripping mechanisms 24a, 24b of the machining apparatus 14, 16. Then, while the workpieces W are being rotated, the opposite surfaces thereof are simultaneously machined by the cutting mechanism 26, after which the machined workpieces W are delivered in the same horizontal condition toward the second conveyor 12b by the second transfer mechanism 125b. Therefore, the transfer mechanisms 125a, 125b are much simpler in structure than the conventional mechanisms or robots which are required to angularly move workpieces from a horizontal condition to a vertical condition, and the workpieces W can be transferred easily and in a short period of time.

In the workpiece machining system, the workpiece gripping mechanisms 24a, 24b of the first and second machining apparatus 14, 16 are disposed on the path of travel of the workpieces W interconnecting the first and second conveyors 12a, 12b. Therefore, the transfer mechanisms 125a, 125b are only required to be displaced vertically and horizontally, and hence are structurally simple and can be controlled simply. The transfer mechanisms 125a, 125b do not require complex control processes which would otherwise be required by the use of conventional robots, and can easily be maintained or serviced.

While workpieces W are being machined by the first machining apparatus 14, machined workpieces W and new workpieces W can be exchanged on the second machining apparatus 16. This permits the workpieces W to be machined highly efficiently by the first and second machining apparatus 14, 16. Moreover, each of the machining apparatus 14, 16 has two workpiece gripping mechanisms 24a, 24b, and can simultaneously machining the opposite surfaces of two workpieces W with the machining units 88, 90 of the cutting mechanism 26. Consequently, the process of machining workpieces W is made highly efficient, so that a large number of workpieces W can be machined quickly in a short period of time.

According to the illustrated embodiment, while a workpiece W is being rotated in a horizontal condition, the opposite surfaces thereof are simultaneously machined by the cutting tools 98a, 98b which are vertically movable toward and away from each other. The distance between the cutting tools 98a, 98b can be adjusted by the presser means 100a, 100b which press the arms 96a, 96b. By positioning the presser means 100a, 100b in vertically juxtaposed relationship, the machining units 88, 90 are held out of physical interference with each other, and can be located closely to each other. With this arrangement, it is possible in each of the first and second machining apparatus 14, 16 to keep the workpiece gripping mechanisms 24a, 24b which clamp two workpieces W and rotate them in the horizontal condition, spaced a minimum distance from each other. As a consequence, the first and second machining apparatus 14, 16 may be installed in a much smaller space than the conventional system in which respective machining apparatus for machining two workpieces are spaced from each other by a relatively large distance.

Furthermore, the cutting tools 98a, 98b in each of the machining units 88, 90 are displaceable toward and away from the centers of rotation of workpieces W. Even if these workpieces W have different dimensions, the opposite surfaces of the workpieces W can reliably and efficiently be machined.

Since the machining units 88, 90 are mounted on the single block 86, the number of moving means comprising the rotative drive source 80, the block 86, and other components is half the number of moving means which are required by a system in which the machining units 88, 99 would individually be movable with respect to the workpiece gripping mechanisms 24a, 24b.

When the opposite surfaces of workpieces W are machined on each of the machining units 88, 90, the distance between the cutting tools 98a, 98b may be kept constant for machining the workpieces W highly accurately even if the cutting tools 98a, 98b are subject to cutting resistance.

More specifically, the single holder 92 of the cutting mechanism 26 is divided by the slit 94 into the pair of arms 96a, 96b which are spaced a certain distance from each other, and the cutting tools 98a, 98b are mounted respectively on the distal ends of the arms 96a, 96b in confronting relation to each other. The presser means 100a, 100b engaging the outer surfaces, respectively, of the arms 96a, 96b are operated to cause the pressers 115 to elastically deform the arms 96a, 96b, after which the distance between the cutting tools 98 a, 98b is adjusted to a desired gap for cutting the opposite surfaces of the workpiece W. At this time, the arms 96a, 96b are angularly positioned by the pistons 104 held against the tip ends of the positioning bolts 116 by adjusting the extent to which the positioning bolts 116 project into the cylinder 102.

Since the arms 96a, 96b are independently positioned by the respective presser means 100a, 100b, the distance between the cutting tools 98a, 98b on the respective arms 96a, 96b can accurately be selected. Moreover, inasmuch as the arms 96a, 96b supporting the cutting tools 98a, 98b are directly pressed and held by the pressers 115 of the presser means 100a, 100b, the arms 96a, 96b are prevented from being displaced away from each other even if the cutting tools 98a, 98b undergo cutting resistance when the workpiece W is machined. As a result, the cutting tools 98a, 98b remain firmly spaced by a desired gap for highly accurately machining the workpiece W.

After the opposite surfaces of the workpiece W have been machined by the cutting tools 98a, 98b, the presser means 100a, 100b are actuated to displace the pistons 104 in directions away from the positioning bolts 116. Therefore, the arms 96a, 96b which have been pressed inwardly toward each other by the pressers 115 spring back away from each other under their own resiliency to displace the cutting tools 98a, 98b away from the opposite surfaces of the workpiece W. Upon spacing the machining units 88, 90 from the workpieces W, the cutting tools 98a, 98b are prevented from contacting and hence damaging the workpieces W. The workpieces W can thus be machined highly accurately without unwanted damage.

In the workpiece gripping mechanism 24a, the inner wall surface of the splined hole S in the workpiece W is pressed by the collet chuck 66a, and the inner peripheral surface N of the workpiece W is pressed by the chuck fingers 55a engaging the chucking rods 46a, thus holding the workpiece W in position. Even if the splined hole S is considerably smaller than the diameter of the workpiece W, the workpiece W can accurately and firmly be held in position without being affected by running resistance applied to the cutting tools 98a, 98b by holding the inner peripheral surface N of the workpiece W.

The connector 44a is swingably coupled to the piston rod 38a through the spherical bearing 40a, and the chucking rods 46a are coupled to the connector 44a through the respective spherical bearings 47a. Therefore, even if the splined hole S in the workpiece W and the inner peripheral surface W are out of coaxial alignment, the chuck fingers 55a can be positionally adjusted to compensate for such coaxial misalignment for reliably gripping the workpiece W, and the workpiece W is prevented from being deformed as no excessive gripping forces are applied to the workpiece W.

The chuck fingers 55a are diametrically and circumferentially swingable while being guided by the oblong holes 60a and the guide pins 61a. This permits the chuck fingers 55a to be held accurately against the inner peripheral surface of the workpiece W. Since the chuck fingers 55a are not axially moved, they are also effective in preventing axial forces from being applied to the workpiece W and hence preventing the workpiece W from being strained by such axial forces.

When a disc-shaped workpiece W having a relatively small splined hole S is transferred, the workpiece W is supported on the receivers 154a, 154b by angularly displacing the holder fingers 150a, 150b with the cylinder 160, and then the cylinder 140 is operated to bring the centering member 142 into the splined hole S to position the workpiece W. Since the centering member 142 is substantially conical in shape, it can move the workpiece W into a desired position even if the workpiece W is positionally displaced with respect to the desired position. The workpiece W can thus be centered automatically.

While the lower surface of the workpiece W is supported on the receivers 154a, 154b, the upper surface of the workpiece W is pressed down by the centering member 142. Thus, the workpiece W can securely be held in position by and between the centering member 142 and the receivers 154a, 154b.

Even when the workpiece W as it is conveyed down the first conveyor 12a is positionally displaced out of position, the workpiece W can reliably be positioned in place by the first transfer mechanism 125a, and it is possible to accurately deliver respective workpieces W to the workpiece gripping mechanisms 24a, 24b of the first and second machining apparatus 14, 16. The workpieces W are therefore prevented from being erroneously positioned with respect to the workpiece gripping mechanisms 24a, 24b and also from dropping off while they are being transferred. Consequently, the workpieces W can automatically be machined highly efficiently.

The two holder means 136, 138 are actuated in unison by the single cylinder 160. This is advantageous in that workpieces W can be transferred highly efficiently and the system is economical as the number of drive sources is reduced.

With the present invention, as described above, the workpiece machining system has a plurality of machining apparatus arranged side by side for simultaneously machining the opposite surfaces of relatively thin workpieces such, for example, as discs for disc brakes while maintaining the workpieces horizontally and rotating them about their axes. Workpieces are picked up from the workpiece inlet conveyor line, mounted on the machining apparatus, and then machined. The machined workpieces are then delivered to the workpiece outlet conveyor line in the same condition or attitude as that in which they are fed from the inlet conveyor line and machined. The workpieces can thus easily and quickly be transferred from the inlet conveyor line to the machining apparatus and the outlet conveyor line since the workpieces are loaded into the machining apparatus and fed out to the outlet conveyor line in the same attitude. The transfer mechanisms can easily be controlled, are simple in construction, and can be manufactured economically because they are only required to be displaced vertically and horizontally while gripping workpieces.

While workpieces are being machined on one of the machining apparatus, machined workpieces can be delivered from the other machining apparatus to the outlet conveyor line. Accordingly, the machining process of the workpiece machining system is not interrupted when machined and new workpieces are exchanged, and hence is highly efficiently performed.

Moreover, the machining apparatus of the invention comprises workpiece gripping mechanisms for horizontally holding workpieces and rotating them, and a cutting mechanism including machining units each having cutting tools vertically movable toward and away from each other for simultaneously machining the opposite surfaces of a rotating workpiece. Since the machining units include such vertically movable cutting tools, the machining units are held out of mutual physical interference, and can be located as closely to each other as possible. The machining units are not required to be relatively widely spaced apart, as is the case with the conventional workpiece machining system, and can efficiently be placed in a small space.

The plural machining units are mounted on the single block which is movable toward and away from the workpiece gripping mechanisms. The number of necessary drive sources and parts for the block is reduced to make the overall system small in size and inexpensive to manufacture. The plural machining units are capable of simultaneously machining a number of workpieces, so that the entire workpiece machining process is rendered efficient A pair of cutting tools for machining the opposite surfaces of each workpiece is mounted on respective arms of a cutting tool holder which is elastically deformable, and the arms are pressed directly by presser means for adjusting the distance between the cutting tools to accurately machine the opposite surfaces of the workpiece at the same time. As the arms of the cutting tool holder are independently pressed by the presser means, the distance between the cutting tools can accurately be adjusted to a desired gap. Even if the cutting tools are subject to cutting resistance while machining the workpiece, the distance or gap between the cutting tools remains unchanged because the presser means are directly held in engagement with the arms. Consequently, the opposite surfaces of the workpiece can be machined to a nicety.

Each workpiece gripping mechanism for gripping and rotating a workpiece in a horizontal condition has a collet chuck for engaging in a reference hole in the workpiece, a plurality of chuck fingers disposed around the collet chuck, and a plurality of chucking rods swingable for moving the respective chuck fingers radially. The workpiece gripping mechanism of this construction can stably grip the workpiece with sufficient gripping forces at a position near the areas of the workpiece which are to be machined, without imposing undue deformation or strain on the workpiece. As a result, a heavy cutting process can be effected highly accurately on the workpiece.

While transferring a workpiece, opposite diametrical ends thereof are supported on the receivers which are movable toward and away from each other, and the workpiece is positioned by the centering member which is movable toward and away from the workpiece, so that the workpiece is securely held jointly by the receivers and the centering member. Even if a positioning hole in the workpiece is small in diameter, therefore, the workpiece can be firmly held in position without the danger of dropping off during the transfer of the workpiece. The workpiece can be centered accurately, and can be transferred reliably for efficient machining operation.

Since two workpieces can simultaneously be transferred, the efficiency of the machining process is high.

Although a certain preferred embodiment has been shown and described, it should be understood that many changes and modifications may be made therein without departing from the scope of the appended claims.

What is claimed is:
1. A workpiece machining system comprising:
a first workpiece inlet conveyor line;
a second workpiece output conveyor line;
at least two machining apparatus disposed on a workpiece transfer path between said first and second conveyor lines, for machining respective workpieces while holding and rotating the workpieces in a same attitude as that in which the workpieces are conveyed along said first and second conveyor lines;
a transfer apparatus for transferring the workpieces from said first conveyor line through said machining apparatus to said second conveyor line while maintaining the workpieces in the same attitude, said transfer apparatus comprising a first transfer mechanism for transferring the workpieces from a pickup point on said first conveyor line to respective machining positions on said at least two machining apparatus, and a second transfer mechanism for transferring the machined workpieces from said machining positions to a delivery point on said second conveyor line, wherein said pickup and delivery points and said respective machining positions are disposed substantially colinearly along said transfer path, each of said first and second transfer mechanisms including holder means for holding the workpieces, wherein each said holder means comprises a pair of holder fingers movable toward and away from each other for supporting one of the workpieces; and each of said machining apparatus comprising at least one workpiece gripping mechanism for holding and rotating a workpiece in a horizontal attitude, and a cutting mechanism having at least one machining unit for simultaneously machining upper and lower surfaces of the workpiece which is being held and rotated by said workpiece gripping mechanism, said machining unit comprising a pair of cutting tools vertically spaced from each other and movable toward and away from each other, and said workpiece gripping mechanism comprising a vertically extending spindle and a chuck unit disposed upwardly of said spindle for gripping said workpiece.

2. The workpiece machining system according to claim 1, wherein said cutting mechanism has means for moving said machining unit toward and away from the center of rotation of said workpiece gripping mechanism.

3. The workpiece machining system according to claim 1 or 2, further comprising an actuator for moving the pair of cutting tools toward and away from each other.

4. The workpiece machining system according to claim 3, wherein said chuck unit is rotatable in unison with said spindle.

5. The workpiece machining system according to claim 1, wherein each of said machining apparatus comprises two said workpiece gripping mechanisms spaced from each other, a block movable toward and away from said workpiece gripping mechanisms by an actuator, and wherein said cutting mechanism has two machining units mounted on said block for cooperation with said workpiece gripping mechanisms, respectively.

6. The workpiece machining system according to claim 1, wherein each of said machining apparatus comprises two said workpiece gripping mechanisms spaced from each other by a distance, each of said first and second transfer mechanisms including two holder means for holding the workpieces, respectively, and spaced from each other by said distance.

7. The workpiece machining system according to claim 6, wherein each of said holder means further comprises a rod operatively coupled to one of said holder fingers of each said two holder means, and link means operatively connected to said holder fingers for linking together said pair of holder fingers, each of said holder means sharing a single actuator coupled to the rod for simultaneously actuating said two holder means.

8. The workpiece machining system according to claim 7, wherein each of said holder means has a substantially conical centering member movable toward and away from one of the workpieces for engaging a central hole defined in the workpiece for positioning the workpiece.

* * * * *